United States Patent [19]

Rauch

[11] Patent Number: 4,572,698
[45] Date of Patent: Feb. 25, 1986

[54] KEY STOP FOR A MARINE PROPELLER SHAFT

[75] Inventor: George W. Rauch, Longboat Key, Fla.

[73] Assignee: General Propeller Company, Bradenton, Fla.

[21] Appl. No.: 578,827

[22] Filed: Feb. 10, 1984

[51] Int. Cl.[4] .......................... B25G 3/28; F16B 3/00
[52] U.S. Cl. ..................................... 403/356; 403/318
[58] Field of Search ........................ 403/356, 358, 318

[56] References Cited

U.S. PATENT DOCUMENTS

| | | | |
|---|---|---|---|
| 1,049,984 | 1/1913 | Bowers | 403/318 |
| 2,563,166 | 8/1951 | Gardner | 403/358 X |
| 2,905,490 | 9/1959 | Traudel | 403/356 |
| 3,862,808 | 1/1975 | Perini | 403/318 |

FOREIGN PATENT DOCUMENTS 451870  3/1975  U.S.S.R. ............................. 403/356

Primary Examiner—Andrew V. Kundrat
Attorney, Agent, or Firm—Welsh & Katz, Ltd.

[57] ABSTRACT

An improved key stop for use in connection with a marine propeller and drive shaft assembly. The key includes a pin positioned for insertion into a radial bore in the keyway, thus precluding axial movement fore and aft of the key in the keyway, while retaining ease of installation of the propeller hub on the drive shaft.

6 Claims, 4 Drawing Figures

KEY STOP FOR A MARINE PROPELLER SHAFT

This invention relates to marine propeller shafts and more particularly to an improved machine key for use in securing a propeller to a propeller shaft.

BACKGROUND OF THE INVENTION

Conventional hubs, such as marine propeller hubs, are axially positioned on a tapered end of a shaft. The propeller and hub assembly is attached to the shaft for following movement through the use of a key secured in a keyway between the shaft and hub. A variety of key shapes and combinations with other elements have been used in the past to prevent movement of the key in the keyway during use. Such movement can occur when the speed of rotation of the hub is altered or the direction of rotation of the hub is changed. Thus, the key tends to slide longitudinally in the keyway in one direction or the other dependent primarily on the direction of rotation of the shaft. When the key is permitted to slide and move relative to the surfaces of the keyway in the shaft, the hub and the surface of the key may become misaligned, setting up a situation in which, under the stress of use, can cause fractures and breaking of the shaft end, lost propellers, and the like. In an effort to correct these problems tapered keys have been used for achieving a wedging action to take up any slack motion which may exist between the parts, as set forth in U.S. Pat. No. 3,877,828. Others, as taught in U.S. Pat. No. 3,862,808, have provided lateral positioning lugs on one end of the key and placement of the key in an axial keyway with corresponding lateral shoulders so that the key may not move axially in a forward direction. Still others have held the key rigidly in the keyway through the use of screws, as in U.S. Pat. No. 3,180,164.

In addition, with the mating tapered surfaces which are used in joining marine propellers and propeller shafts, a keyway which closely borders all sides of the key requires that the mating surfaces be precisely machined, with exacting tolerances, so that the mating tapered surfaces are joined at a predetermined position of the shaft. Generally, when a keyway has no provision for a stop at either end of the propeller, i.e., has a line of sight passageway therethrough, the key is apt to slide in the keyway during both installation and operation of the propeller.

There are teachings in the prior art which enclose the keyway on the propeller hub, thereby restricting movement of the key; however, placement of the hub on the propeller shaft becomes difficult, if not impossible, as an assemblyman must first expand the hub, as by heating, and then squeeze the hub over the key into place on the shaft. With the rigid materials generally in the use in the marine field, such expansion without permanent deformation is not possible without utilizing exotic and expensive materials.

Such a difficult procedure is demonstrated in the turbine field by U.S. Pat. No. 3,877,827, which attempted to solve the above described problem by providing a projection which extends outwardly for insertion into a mating circumferential groove in a surrounding collar or disc. The projection must be small enough to permit the disc to slide over it and onto the shaft when heated for expansion purposes.

SUMMARY OF THE INVENTION

Therefore, an object of the subject invention is an improved marine propeller shaft and key for connecting marine propellers thereto.

Another object of the subject invention is a prolonged shaft and key life by the inclusion of an axial keyway and a mating key having a downwardly extending pin for engagement with a corresponding bore in the shaft.

A still further object of the subject invention is a hub and shaft assembly having mating tapered surfaces and an improved key means which prevents movement of the key means in both fore and aft directions.

Another object of the subject invention is an easily installable hub and shaft assembly having an immovable key within a keyway. P These and other objects are obtained in accordance with the present invention wherein there is provided an improved shaft and hub assembly with mating tapered surfaces for use in connection with marine propellers. The shaft has a radially directed bore in a keyway into which a corresponding radially directed pin fixedly located on the key is inserted. The provision of the radially directed pin inserted into the corresponding bore prevents the key from sliding longitudinally either fore or aft in the keyway of the propeller shaft as may happen without the pin in installation of the propeller hub or during torque forces normally generated in use. After placing the key in the keyway with the pin inserted in the bore, the hub may then be secured to the shaft by thrusting the tapered surfaces together until contact is made. The propeller hub and shaft are then secured together by conventional means such as a nut threaded onto the shaft terminal end.

DESCRIPTION OF THE DRAWINGS

Further objects of the invention together with additional features contributing thereto and advantages accruing therefrom will be apparent from the following description of one embodiment of the invention when read in conjunction with the accompanying drawings wherein:

Referring now to FIG. 1 there is shown a propeller hub and shaft assembly 10 having a propeller hub assembly 20 mounted on a shaft 12. More particularly, the propeller hub assembly 20 is fixedly engaged with a tapered portion 18 of shaft 12. The hub assembly 20 is generally secured to the shaft 12 by conventional means such as nuts 14 and washer 15 on threaded shaft terminal 16, with a cotter pin 13 as a positive lock to prevent loosening of the nuts 14. The hub assembly is thus biased forward into a fixed position on tapered shaft portion 18. The hub assembly engaging portion 18 of shaft 12 is tapered to match a corresponding taper of the shaft engaging surface 22. In this manner the propeller hub is locked into position and movement fore or aft of the hub on the shaft 12 becomes impossible without fracturing the structures involved, providing that the respective tapers of the mating surfaces 18 and 22 are machined within correct tolerances and the nut 14 is tightly secured on the threaded portion 16 of the shaft. As the keyway 24 in the hub 20 is open at least in the rear hub portion, positioning of the hub on the shaft need not be precise.

In FIG. 1 key 30, with a radially extending pin 32, is shown securing the hub assembly 20 against rotational movement of the hub assembly relative to the shaft, as will be described.

Figure 1:
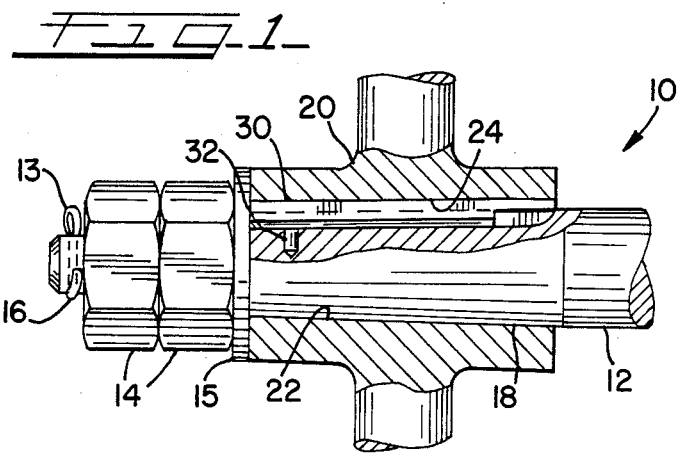
FIG. 1 is a side plan view of one embodimemt of a marine propeller shaft end which has been partly cut away to illustrate the key and keyway of the subject invention.
Figure 2:
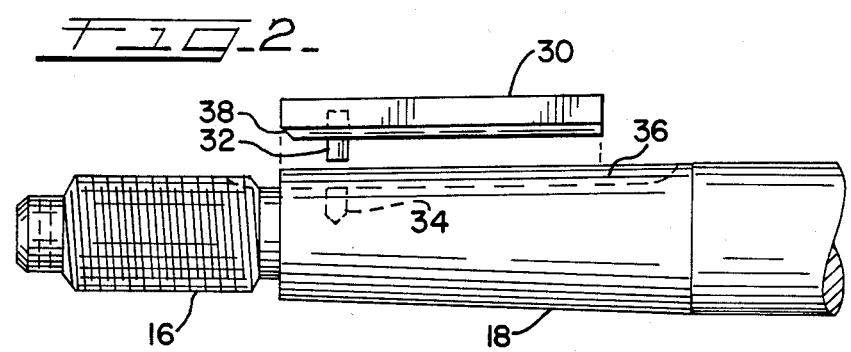
FIG. 2 is a side plan view of one embodiment of the propeller shaft showing the key suspended over the keyway, with the keyway and keyway bore shown in dotted line.

As better shown in FIG. 2, keyway 36 extends along a major portion of the tapered shaft portion 18 into the threaded terminal portion 16. Spaced a short distance from the terminal end of the keyway and in the keyway is bore or hole 34.

Figure 4:
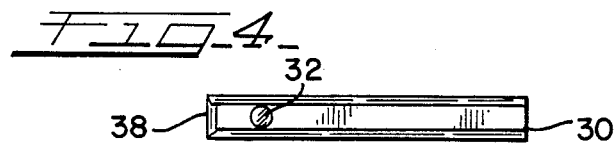
FIG. 4 is a bottom plan view of the key of the subject invention.

Key 30, best shown in FIGS. 2 and 4, comprises a length of rectangular bar having a chamfered or beveled corner 38 at one end and a pin 32 preferably spaced from the chamfered end, yet in close proximity thereto. While the pin 32 may be of any desired shape, it is preferably of round stock and of a size as will extend from one surface only, i.e., the surface bearing the chamfered corner. By providing a beveled corner, the key may be easily removed on disassembly of the shaft assembly 10. The beveled corner provides easy access for a prying tool for lifting a key which may be frozen in place. The opposing longitudinal key edges on the key may also be beveled to permit the key to be machined without sharp corners and to allow a certain accumulation of dirt in the keyway while still providing a tight matching fit of the key in the keyway.

The pin 32 may be molded integrally as a part of the key 30 or, as is more likely, may comprise a pin secured within a hole drilled to a size that will accept the pin and hold it fast.

Figure 3:
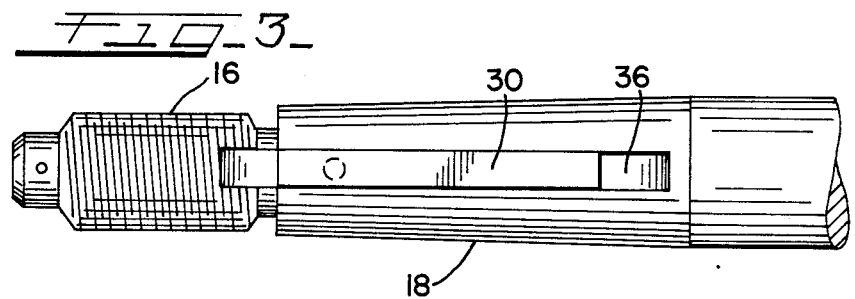
FIG. 3 is a top plan view of the propeller shaft of FIG. 2 showing the key in place in the keyway and the extension of the keyway into the threaded shaft portion.

The key is used by positioning it in the keyway as shown in FIG. 3. The propeller hub 20 is aligned to place the hub keyway 24 in registry with the key 30 in the shaft keyway 36 and set in place by thrusting the propeller hub 20 over the shaft tapered end 18 until the propeller hub surface mates with the tapered surface of the shaft 18 and movement is stopped. The propeller hub is secured in this position by tightening lug nuts 14 on the threaded shaft portion 16 against the propeller hub and locked in place with cotter pin 13.

As a result of key pin 32 resting within bore 34, the axial sliding of the key in the keyway in both fore and aft directions during use and propeller hub installation is effectively precluded. As a result, the key is automatically correctly positioned in each installation in a foolproof manner such that the full torque load is directed uniformly so as not to weaken, break or fracture any portion of the shaft end. By prevention of both fore and aft movement of the key in the keyway, the great stresses and forces present in the sudden reversal of rotation of the shaft changing the forces on the propeller hub from, for example, a thrust directed fore to a thrust directed aft do not affect the integrity of the joinder with the shaft. Should the key be allowed to shift aft as appears possible in the devices of the prior art, the key can ride up and jam the propeller hub to render removal difficult. Or, the key, in its movement, may cross the threaded portion of the shaft and damage the threads, thereby making the removal of the propeller hub difficult. Such damage to the shaft and other troubles can be alleviated through the use of the subject invention in which the key includes a pin which, by insertion into a mating bore in the keyway, retains the pin in the desired position.

By providing for a keyway on the hub which is at least open on the aft or rearward end of the hub, the hub can first be located so that the respective keyways are aligned and then slipped on the shaft and tightened in place with nuts 14 without regard to location longitudinally on the shaft. The key will always remain, both axially and radially, in the correct placement, regardless of placement of the hub, looseness of the propeller, vibration of the shaft, or direction of torque from the shaft. Such ease of installation combined with integrity of joinder is unique in the art.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A tapered marine propeller shaft and key apparatus comprising:

a shaft for use in driving a propeller to obtain thrust for propelling a boat in water, said shaft having an aft end portion and a tapered portion adjacent from said aft end portion;

said aft end portion being threaded to accept a nut;

a propeller hub having a tapered interior hub portion;

said shaft tapered portion being matable with said hub tapered portion;

an axial keyway in each of said tapered portions, including a first keyway in said hub portion extending through at least the fore propeller side, and a second keyway in said shaft tapered portion extending through at least said threaded aft end portion;

said second keyway having a radial bore;

a key having a pin extending from one surface of said key normal to the longitudinal axis of said key;

said pin being located on said key for insertion into said bore on positioning said key in said keyway;

means on the key accommodating a certain accumulation of dirt in the keyway while still providing a tight fit of the key;

said hub portion being mounted on said shaft and locked in place by locking nut means on said threaded aft end portion, said pin thereby precluding movement of said key in both fore and aft axial directions in said keyway while maintaining facility in the assembly of said shaft and key apparatus.

2. The shaft and key assembly of claim 1 wherein said key is rectangular, having a chamfered edge at one end and wherein said pin is spaced in close proximity to the chamfered edge and extends from the longitudinal surface bearing the chamfered corner for ease of removal of said key.

3. The shaft and key assembly of claim 1 wherein said bore is located near said threaded aft end portion.

4. A tapered marine propeller shaft end and key assembly for receiving a mating propeller hub, said assembly comprising:
- said propeller hub having an internal opening tapering from a front diameter opening to a smaller rear diameter opening;
- a shaft having a threaded end portion and a tapered portion adjacent said threaded end portion;
- said tapered portion being matable with said tapered hub internal opening;
- an axially extending keyway formed in said shaft from said tapered portion to said threaded end portion;
- an axially extending keyway formed in said hub; a key sized to fit tightly within each of said keyways; means on the key accommodating a certain accumulation of dirt in the keyway while still providing a tight fit of the key;
- said keyways each having a uniform depth of approximately one-half the radial thickness of said key;
- a radial bore within said keyway;
- a pin on said key, said pin extending from a bottom surface of said key in perpendicular relation thereto;
- said pin having one chamfered edge on said bottom surface nearest said pin;
- said pin being insertable into said bore on placement of said key into said keyway thereby precluding movement of said key in both fore and aft axial directions.

5. The assembly of claim 4 wherein said keyway extends through a segment of said threaded end portion.

6. The assembly of claim 4 wherein said propeller hub has an axial keyway extending through the front opening.

* * * * *